United States Patent
Terajima et al.

[11] Patent Number: 6,081,346
[45] Date of Patent: *Jun. 27, 2000

[54] DIGITAL IMAGE FORMING APPARATUS

[75] Inventors: Akirou Terajima, Kanagawa; Mamoru Ogasawara, Saitama, both of Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/923,420

[22] Filed: Sep. 4, 1997

[30] Foreign Application Priority Data

Sep. 6, 1996 [JP] Japan .................................. 8-236833

[51] Int. Cl.$^7$ ........................................ H04N 1/21
[52] U.S. Cl. ........................ 358/296; 355/74; 349/196
[58] Field of Search .................... 358/296, 302; 355/37, 38, 65, 71, 77, 74, 75; 250/208.1; 349/2, 3, 196

[56] References Cited

U.S. PATENT DOCUMENTS

| | | | |
|---|---|---|---|
| 4,239,329 | 12/1980 | Matsumoto | 385/11 |
| 5,109,290 | 4/1992 | Imai | 349/2 |
| 5,115,270 | 5/1992 | Kraft et al. | 355/77 |
| 5,122,831 | 6/1992 | Suzuki | 355/37 |
| 5,424,802 | 6/1995 | Saita | 355/38 |
| 5,715,029 | 2/1998 | Fergason | 349/196 |
| 5,729,327 | 3/1998 | Narita | 355/40 |
| 5,731,886 | 3/1998 | Taber et al. | 359/65 |

*Primary Examiner*—Amelia Au
*Assistant Examiner*—Jingge Wu
*Attorney, Agent, or Firm*—Sughrue, Mion, Zinn, Macpeak & Seas, PLLC

[57] ABSTRACT

The present invention allows formation of an image having an excellent finish quality by using an extremely simple and low-cost structure. Linearly polarized light transmitted through each of liquid crystal cells of a liquid crystal panel is made into circularly polarized light by a quarter-wave phase plate, and thereafter, the circularly polarized light is used to expose a photographic printing paper via lithium-niobate prisms serving as a birefringent filter. As a result, light transmitted through a light transmitted area of each of the liquid crystal cells is irradiated on a region on the photographic printing paper corresponding to a light non-transmitted area so as to prevent formation of a pattern caused by the light non-transmitted area.

18 Claims, 6 Drawing Sheets

DIGITAL IMAGE FORMING APPARATUS

BACKGROUND OF THE INVENTION

1. Field of the Invention

The present invention relates to a digital image forming apparatus, and particularly to a digital image forming apparatus in which an image is displayed digitally by controlling light modulation rate of a spatial modulation element on the basis of digital image data and the image is exposed onto a photosensitive material with modulated light.

2. Description of the Related Art

In a photographic printer in which a photographic print is prepared in such a manner that an image photographed to be recorded on a photographic film (for example, a negative film) is printed on a photosensitive material, usually, light is irradiated on the image recorded on the photographic film and the light transmitted through the image is exposed onto a photosensitive material such as a photographic printing paper. There has been recently proposed a photographic printer provided with, in addition to a first exposure section in which the light transmitted through an image on a photographic film is directly exposed onto a photosensitive material as described above, a second exposure section in which an index print image is exposed onto the photosensitive material.

The second exposure section of the above photographic printer is constructed in such a manner that images recorded on the photographic film are sequentially picked up by an image reading device and the thus obtained image data are stored in an image storage section. When index print images are formed on a photosensitive material, image data are read from the image storage section by several frames (by one row of frames) at a time and images of one row of frames are displayed on a liquid crystal panel based on the read image data, and further, light is irradiated on the liquid crystal panel and the light transmitted through the liquid crystal panel is exposed onto the photosensitive material.

When the above-described operation is repeated for each of a plurality of rows of frames, an index print is formed in which a plurality of film images on the photographic film is arranged in the form of a matrix. A user can easily effect retrieval of an image recorded in each of frames on the photographic film, or the like by referring to the index print.

In order to allow display of an image on the liquid crystal panel, a predetermined drive voltage is applied to each of a large number of liquid crystal cells which form the liquid crystal panel, so that the light transmissivity is adjusted for each of the liquid crystal cells. However, each of the liquid crystal cells includes a light non-controllable area which does not allow adjustment of light transmissivity due to the existence of wiring or the like, in addition to a light controllable area which allows adjustment of light transmissivity in accordance with the drive voltage. For this reason, when an image is formed in such a manner that the light transmitted through the liquid crystal panel is exposed onto the photosensitive material, a region on the photosensitive material corresponding to the light non-controllable area cannot be exposed, so that a systematic pattern of a certain fixed density (which is white on a paper) is produced within the formed image.

In order to prevent formation of the above-described pattern, a so-called pixel shift method has conventionally been carried out in which exposure is effected plural times with the liquid crystal panel being moved by a very small amount by piezoelectric elements or the like. In the pixel shift method, since an image is exposed with the liquid crystal panel being moved by very small amount, the light transmitted through the light controllable area of each of the liquid crystal cells can be irradiated on a region on the photosensitive material corresponding to the light non-controllable area, thereby making it possible to prevent formation of the above-described pattern.

However, the above-described conventional method requires expensive piezoelectric elements or the like which is used to allow high accurate movement of the liquid crystal panel by small bits, thereby resulting in complication of the structure of the apparatus and increase in cost thereof.

SUMMARY OF THE INVENTION

In view of the above-described circumstances, it is an object of the present invention to provide a digital image forming apparatus which allows formation of an image having an excellent finish quality by using an extremely simple and low-cost structure.

In order to achieve the above-described object, there is provided, in accordance with the present invention, a digital image forming apparatus comprising: a spatial modulation element in which a large number of pixels formed by a light controllable area that allows light modulation in accordance with digital image data and a light non-controllable area on which wiring is provided is arranged in a two-dimensional manner at a predetermined pixel pitch; a light source that allows light to be irradiated on said spatial modulation element; and birefringent means which causes the light transmitted through the light controllable area of said spatial modulation element to be made birefringent into ordinary light whose optical axis directly advances and also into extraordinary light whose optical axis is refracted and which guides the ordinary light and the extraordinary light to a region on a photosensitive material corresponding to the light controllable area and a region on a photosensitive material corresponding to the light non-controllable area, respectively.

In the above-described structure, light emitted from the light source is irradiated on the spatial modulation element and is transmitted through the light controllable area of the spatial modulation element. The light transmitted through the light controllable area is made birefringent by the birefringent means into ordinary light whose optical axis directly advances and extraordinary light whose optical axis is refracted. The ordinary light is guided to a region on the photosensitive material corresponding to the light controllable area and the extraordinary light is guided to a region on the photosensitive material corresponding to the light non-controllable area.

In the foregoing, the region on the photosensitive material corresponding to the light non-controllable area can be exposed by the light transmitted through the light controllable area of the spatial modulation element without the spatial modulation element being mechanically moved. For this reason, the structure for moving the spatial modulation element (piezoelectric element system or the like) becomes unnecessary and simplification of the structure and reduction in cost thereof can be achieved accordingly.

Further, according to the present invention, there is also provided a digital image forming apparatus comprising: a spatial modulation element in which a large number of pixels formed by a light controllable area that allows light modulation in accordance with digital image data and a light non-controllable area on which wiring is provided is arranged in a two-dimensional manner at a predetermined pixel pitch; a light source that allows light to be irradiated on said spatial modulation element; a quarter-wave phase plate which causes linearly polarized light emitted from said light source and passed through the light controllable area of said spatial modulation element to be made into circularly polarized light; and a birefringent member which causes the light made into the circularly polarized light by said quarter-wave phase plate to be made birefringent into ordinary light and extraordinary light and which guides the ordinary light and the extraordinary light to a region on a photosensitive material corresponding to the light controllable area and a region on a photosensitive material corresponding to the light non-controllable area, respectively.

DESCRIPTION OF THE PREFERRED EMBODIMENTS

First Embodiment

Figure 1:
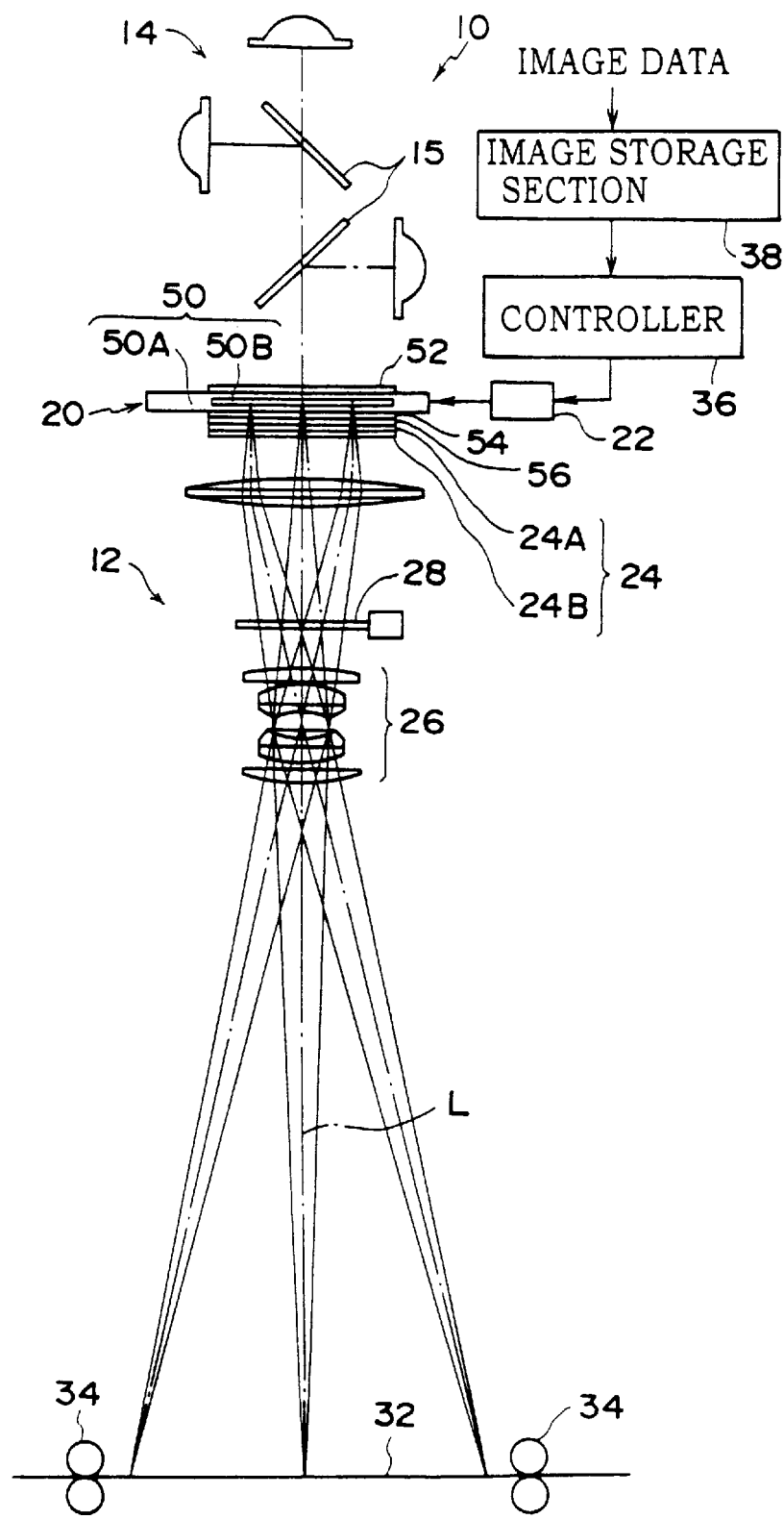
FIG. 1 is a schematic structural view showing a liquid crystal image forming apparatus according to a first embodiment of the present invention.

FIG. 1 shows a liquid crystal image forming apparatus 10 according to a first embodiment of the present invention. The liquid crystal image forming apparatus 10 is used to prepare an index print in such a manner that respective images recorded in frames on a negative film (a photographic film) are sequentially read and displayed on a liquid crystal panel and the displayed images are exposed onto a photosensitive material. As shown in FIG. 1, the liquid crystal image forming apparatus 10 is provided with a printing section 12 in which an image displayed on a liquid crystal panel 20 is exposed onto a photographic printing paper (a photosensitive material). An exposing light source 14 is disposed in the printing section 12. The exposing light source 14 is formed by a light emitting diode (LED) emitting each light of red (R), green (G), and blue (B) and light emitted therefrom is irradiated on the liquid crystal panel 20 (described later) with respective optical axes of emitted light beams coinciding together by a dichroic mirror 15.

The liquid crystal panel 20 is disposed on an exposure optical axis L on a downstream side of the exposing light source 14. As shown in FIG. 1, the liquid crystal panel 20 is formed by a panel main body 50 on which an image is displayed and a pair of polarizing filters 52, 54 whose respective planes of polarization are made perpendicular to each other. The panel main body 50 is provided to be interposed between the pair of polarizing filters 52, 54. A display portion 50B (a light modulation element) is provided in the central portion of a supporting frame 50A of the panel main body 50. The display portion 50B is formed from a plurality of liquid crystal cells which are arranged in the form of matrix at a predetermined pitch (for example, at transverse pitch of 28 $\mu$m and at longitudinal pitch of 35 $\mu$m) and are capable of adjusting the light transmissivity (i.e., light modulation rate). Images are displayed in the display portion 50B by adjustment of the light transmissivity for each of the liquid crystal cells.

As shown in FIG. 1, a birefringent filter (birefringent means) 24 is attached to the surface of the liquid crystal panel 20 on the downstream side, namely, to the polarizing filter 54. The birefringent filter 24 serves to make the optical axis birefringent into ordinary light or extraordinary light (which will be described later in detail).

A black shutter 28, a printing lens 26, and a photographic printing paper 32 are arranged sequentially on the downstream side of the birefringent filter 24. The black shutter 28 is opened and closed by a drive signal from a shutter driver (not shown) to allow passing of the light on the exposure optical axis or to shut off the light. The printing lens 26 is provided to be movable along the exposure optical axis L and the image displayed on the liquid crystal panel 20 is thereby exposed onto the photographic printing paper 32 at a predetermined magnification. The photographic printing paper 32 is conveyed in a predetermined direction by being nipped by conveying roller pairs 34 and a predetermined image forming region on the photographic printing paper 32 is located at an exposure position on the exposure optical axis L. Meanwhile, the photographic printing paper 32 having been previously wound up onto a rotating shaft in the form of a roll is pulled out due to drive of the conveying roller pairs 34.

A controller 36 is connected to the liquid crystal panel 20 via an LCD driver 22. The controller 36 is formed by a CPU, a ROM, a RAM, an input/output controller, and the like (all of which are not shown). Further, an image storage section 38 is connected to the controller 36. The image storage section 38 allows storage of image data which represents an image of the photographic film (for example, the negative film) read by an image reading device (not shown). The controller 36 is provided to take in the image data stored in the image storage section 38 by selecting in accordance with an image frame, set a drive voltage (or electric current) to be applied to the liquid crystal panel 20 on the basis of image density of each color indicated by the taken-in image data, and transmit information which represents the set drive voltage (electric current) to the LCD driver 22. As a result, the set voltage (electric current) is applied to (flows in) each of the liquid crystal cells which form the display portion 50B of the liquid crystal panel 20 so that light transmissivity is adjusted, and an image is displayed accordingly.

Further, the black shutter 28 is connected via a driver (not shown) to the controller 36, and the exposing light source 14 and the conveying roller pairs 34 are also connected to the controller 36. The controller 36 controls these members connected thereto in a previously determined sequence.

Figure 2A:
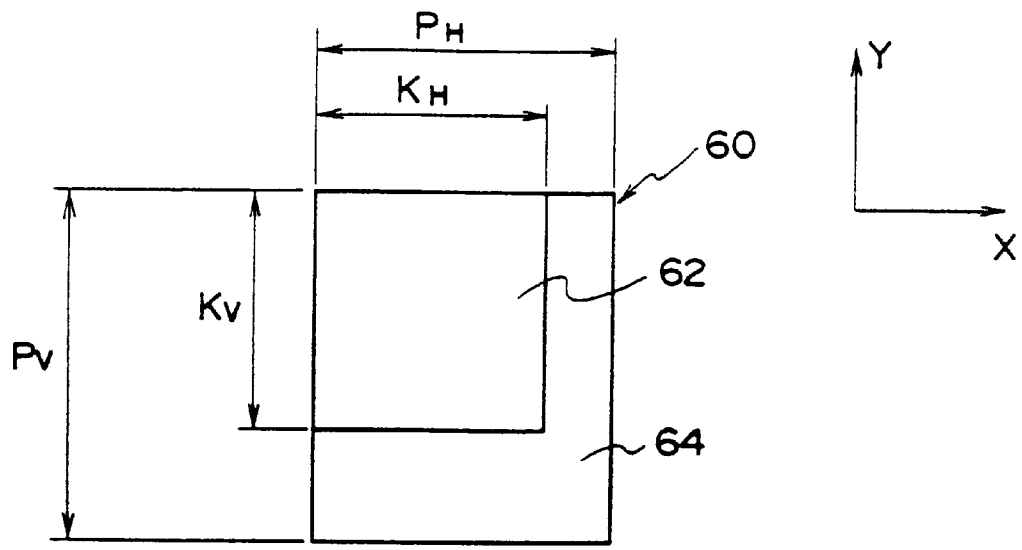
FIG. 2A is a plan view showing an example of each of liquid crystal cells for forming a liquid crystal panel.

Each of the liquid crystal cells of the liquid crystal panel 20 is formed from a light controllable area which allows adjustment of light transmissivity in accordance with the drive voltage (or current) applied to the liquid crystal cell, and a light non-controllable area which does not allow adjustment of light transmissivity. FIG. 2A shows, as an example, a plan view of the liquid crystal cell of a TFT active matrix-type liquid crystal panel (for example, LCX007BNB manufactured by SONY Corp.). In the liquid crystal panel 20, the light non-controllable area 64 is formed along the two sides of the liquid crystal cell 60, which are perpendicular to each other, and the light controllable area 62 is formed at one of four corners of the liquid crystal cell 60. The light non-controllable area 64 is provided to correspond to metallic wiring or the like (for example, a source line used to apply a voltage signal to each of the liquid crystal cells or a gate line used to scan the liquid crystal cell) which is made in the form of matrix on a glass base plate on which liquid crystal cells are formed. Further, the light controllable area 62 is a region that corresponds to a transparent electrode used to apply voltage to a liquid crystal material. When a signal voltage is applied to the transparent electrode through the above-described wiring or the like, the light transmissivity is controlled in accordance with the applied signal voltage.

In the liquid crystal panel 20 (LCX007BNB) of the present embodiment, the vertical pixel pitch, $P_V$, is 35 $\mu$m and the horizontal pixel pitch, $P_H$, is 28 $\mu$m. The vertical and horizontal dimensions of the light controllable area 62, $K_V$ and $K_H$, are 24 $\mu$m and 21.6 $\mu$m, respectively, and a numerical aperture of the liquid crystal cell 60 (an area ratio of the light controllable area) is 53%.

Here, in the above-described liquid crystal panel 20, the light transmitted through an image is made birefringent by a pair of lithium-niobate prisms 24A, 24B serving as the birefringent filter 24, and the refracted light (extraordinary light) is provided to correspond to the above-described light non-controllable area 64 so as to apparently guide an image to a portion of the photographic printing paper 32 corresponding to the light non-controllable area 64.

A quarter-wave phase plate 56 is disposed on the upstream side of the birefringent filter 24 formed by the pair of lithium-niobate prisms 24A, 24B. The quarter-wave phase plate 56 serves to change the transmitted light from the liquid crystal panel 20 (i.e., linearly polarized light) to circularly polarized light. For example, a mica plate can be applied to the quarter-wave phase panel 24.

An optical axis of the circularly polarized light is divided into ordinary light and extraordinary light by the pair of lithium-niobate prisms 24A, 24B. At this time, due to the circularly polarized light passing through the pair of lithium-niobate prisms 24A, 24B, relative positions of the ordinary light and the extraordinary light are adjusted. Namely, when the ordinary light passes straight through the light controllable area of the liquid crystal panel 20 to reach the photographic printing paper 32, the position of the light non-controllable area with respect to the light controllable area in one pixel is set, and therefore, the extraordinary light is provided to reach a region on the photographic printing paper 32 corresponding to the light non-controllable area.

Meanwhile, as the setting parameters, each thickness of the lithium-niobate prisms 24A, 24B and the laminated relative angle of the pair of lithium-niobate prisms 24A, 24B are defined.

Figure 3:
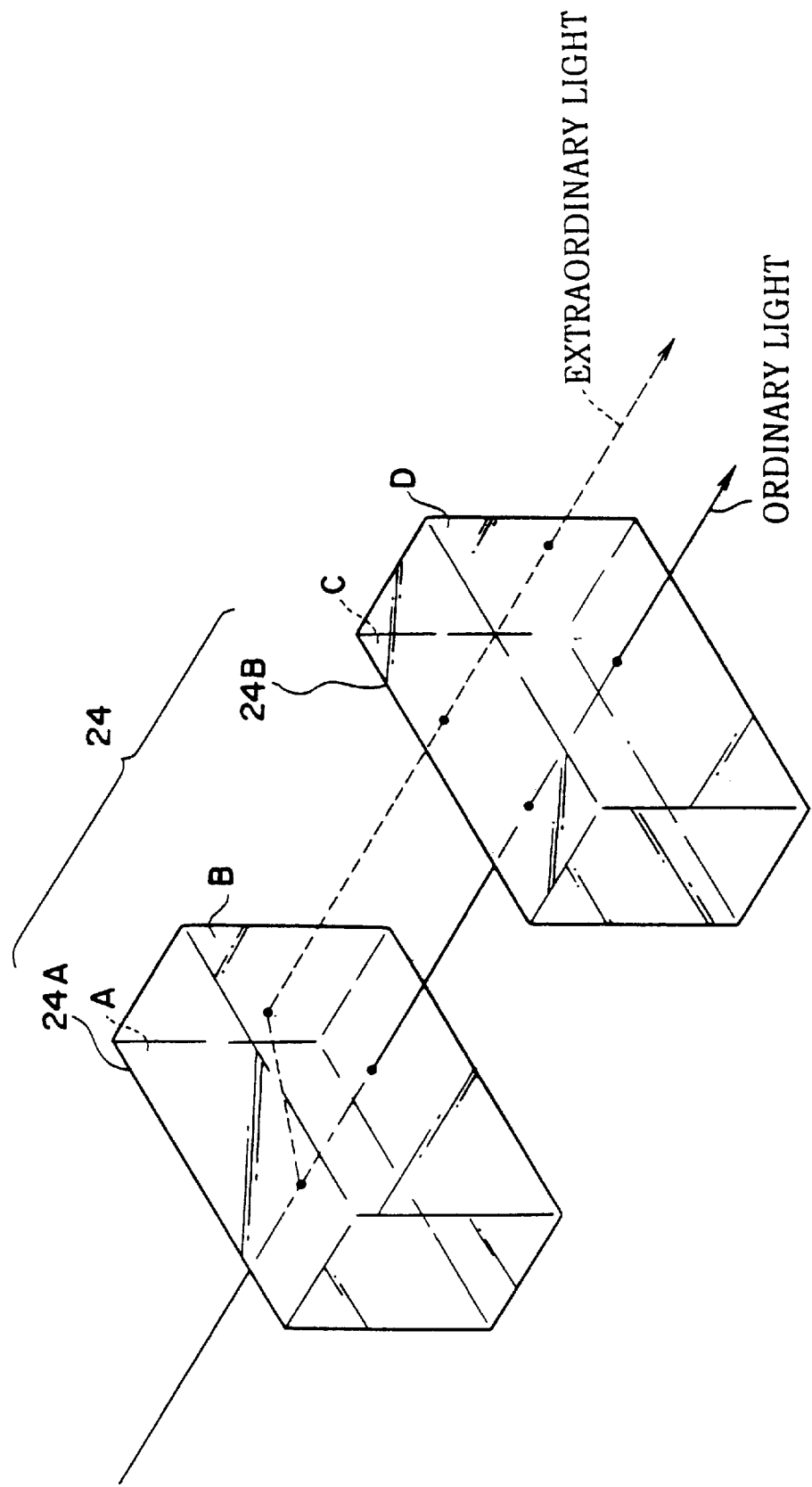
FIG. 3 is a model diagram showing birefringence of a birefringent filter (of lithium-niobate) according to the first embodiment.

FIG. 3 shows a birefringent model diagram with the lithium-niobate prisms 24A, 24B used.

In the model diagram shown in FIG. 3, the first and second lithium-niobate prisms 24A, 24B are arranged parallel to each other and light transmitted through the liquid crystal panel 20 (see FIG. 1) is made incident on the first lithium-niobate prism 24A from the rear side thereof on the paper of FIG. 3, and is emitted from the surface of the second lithium-niobate prism 24B toward the front side on the paper of FIG. 3. The planes of incidence and exit of the first lithium-niobate prism 24A are respectively referred to as surface A and surface B, and the planes of incidence and exit of the second lithium-niobate prism 24B are respectively referred to as surface C and surface D. Further, in order to allow easy understanding, the point of incidence on surface A is used as an origin and x axis and y axis are provided to correspond to each of the above surfaces (for example, $x_A$ axis and $y_A$ axis are given for surface A and $x_D$ axis and $y_D$ axis are given for surface D, which are both viewed from the side of surface D of the second lithium-niobate prism 24B (see FIGS. 4C, 4D)).

The optical axis of the light transmitted through the liquid crystal panel 20 is, as shown in FIG. 3, made incident on the first lithium-niobate prism 24A from the origin of surface A (see FIG. 4A) and is divided into ordinary light and extraordinary light due to birefringence. The ordinary light is emitted from the origin of surface B of the first lithium-niobate prism 24A and the extraordinary light is emitted from a first quadrant, namely, the coordinates disposed on a plus side in both directions of $x_B$ and $y_B$ (see FIG. 4B). Meanwhile, in the present embodiment, $\theta$ is set at 45°.

Figure 4A:
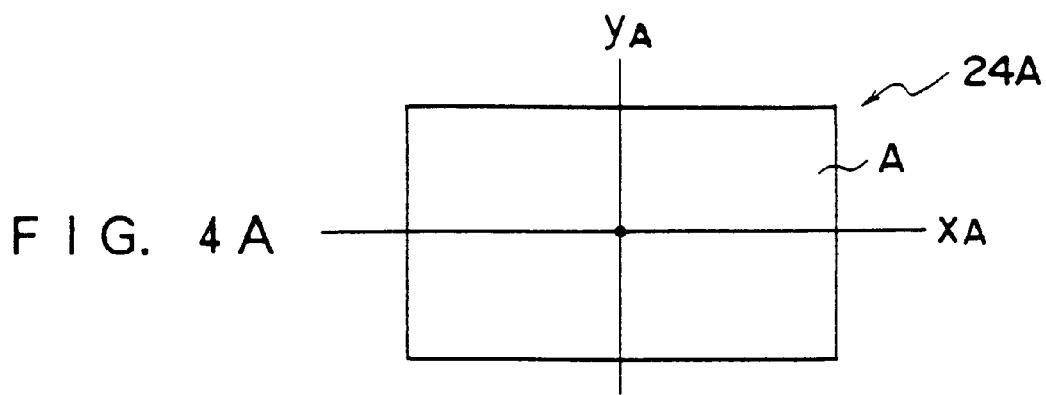
FIGS. 4A through 4D each show in coordinates an optical-axis position on the plane of incidence or on the exit plane of a lithium-niobate member according to the first embodiment.
Figure 4B:
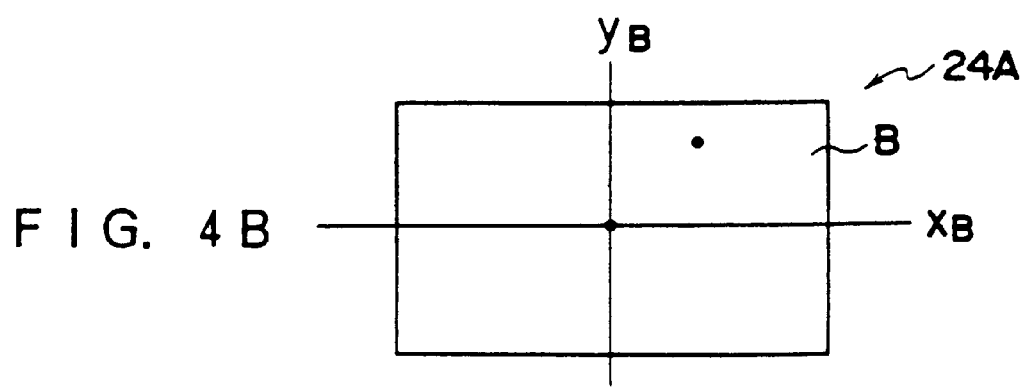
Figure 4C:
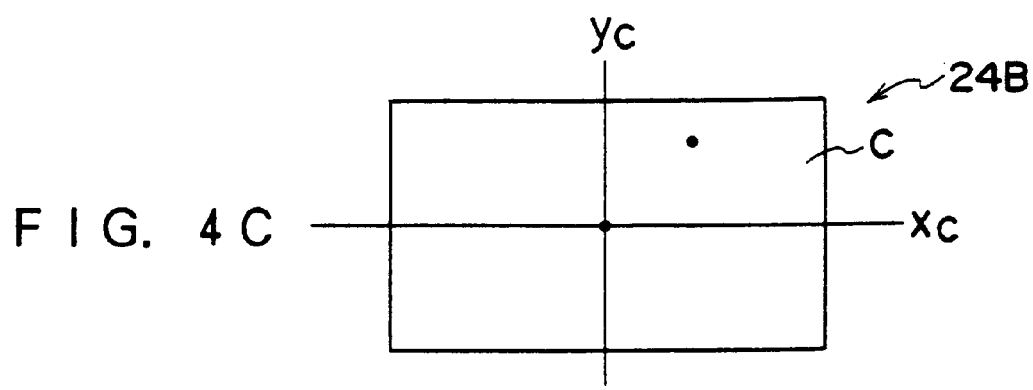

The ordinary light and the extraordinary light emitted from the first lithium-niobate prism 24A are, while being kept in the state of being parallel to each other, made incident on surface C of the second lithium-niobate prism 24B (see FIG. 4C). Accordingly, the exit coordinates of the first lithium-niobate prism 24A and the incidence coordinates of the second lithium-niobate prism 24B coincide with each other.

Figure 4D:
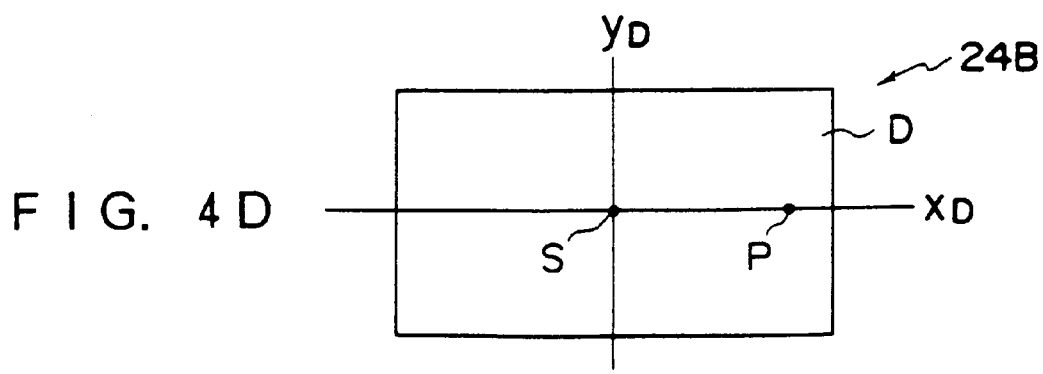

The light incident on the second lithium-niobate prism 24B is further made birefringent, and the ordinary light is kept at the origin and the extraordinary light is refracted to reach a coordinate point in which $x_D$-axis direction is disposed on the plus side and $y_D$-axis direction is disposed on the minus side (see FIG. 4D).

As described above, the coordinate point of the ordinary light and the extraordinary light shown in FIG. 4D finally becomes a point of illumination on the photographic printing paper 32 after birefringence. For this reason, by setting each thickness of the first and second lithium-niobate prisms 24A, 24B and lamination relative angle therebetween, the relative positions of the ordinary light and the extraordinary light on surface D can be determined.

Next, an operation of the present embodiment will be described.

When an index print is prepared in the liquid crystal image forming apparatus 10, first, image data which represents an image recorded on each of the frames on a negative film is stored in the image storage section 38 of the liquid crystal image forming apparatus 10. The image data storing operation is effected in such a manner that images of a negative film are sequentially read by an image reading device (not shown). When image data of one roll of negative film are stored in the negative image storage section 38, the controller 36 is provided to take in image data of several frames (for example, five frames) from the image storage section 38 to prepare, based on the taken-in image data, index images in which images of several frames are arranged in one row. Subsequently, the drive voltage of the liquid crystal panel 20 is set based on the image data for each color of the prepared index image and each of the liquid crystal cells 60 of the liquid crystal panel 20 is driven by the set drive voltage. As a result, the light transmissivity of the liquid crystal panel 20 is adjusted for each of the liquid crystal cells 60 and an index image for each color is thereby displayed.

After the index image of the first color is displayed on the liquid crystal panel 20, one of the LEDs of colors in the exposing light source is turned on and thereafter the black shutter 28 is opened and closed. As a result, light emitted from the exposing light source 14 is irradiated on the liquid crystal panel 20 and the light transmitted through the liquid crystal panel 20 passes through the birefringent filter 24 and the printing lens 26 to form an image on the photographic printing paper 32. Subsequently, the index image of the second color and the index image of the third color are sequentially displayed, and with the LED for giving color corresponding to each of the second and third colors being turned on, the above-described exposure processing is repeated. As a result, a color image can be formed on the photographic printing paper 32.

The controller 36 is provided to prepare an index print in which a plurality of images of the negative film are arranged in the form of a matrix by repeating the above-described exposure of index images.

The liquid crystal cells 60 which form the above-described liquid crystal panel 20 each include the light controllable area 62 and the light non-controllable area 64 (see FIG. 2A). Light emitted from the exposing light source 14 to reach the liquid crystal panel 20 is transmitted through only the light controllable area 62 of each of the liquid crystal cells 60. The light transmitted through the light controllable area 62 of the liquid crystal cell 60 (linearly polarized light) passes through the quarter-wave phase plate 56 (see FIG. 1) to be made into circularly polarized light, and reaches two laminated lithium-niobate prisms (the first and second lithium-niobate prisms 24A, 24B). As shown in FIG. 4A, the light incident on the origin on surface A of the first lithium-niobate prism 24A is divided into the ordinary light and the extraordinary light due to birefringence, and is subsequently emitted from surface B (see FIG. 4B). The emitted light is, while being kept in a state of being parallel to each other, made incident on surface C of the second lithium-niobate prism 24B (see FIG. 4C), and is subsequently emitted from surface D as two optical axes S, P (see FIG. 4D).

Figure 2B:
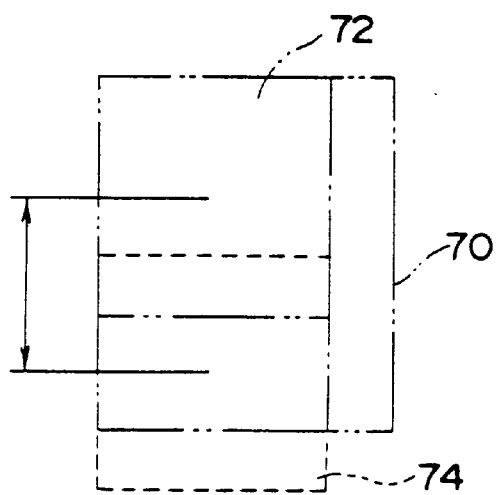
FIG. 2B is a diagram showing an exposure region on a photographic printing paper corresponding to the liquid crystal cell.

In the present embodiment, an exit position of light which advances along the optical axis P within the birefringent means is set to be separated from an exit position of light along the optical axis S by a half of a pixel pitch (i.e., $P_V/2=17.5\,\mu m$) in the vertical direction (i.e., y-axis direction) of the liquid crystal cell 60. For this reason, the light advancing along the optical axis P within the birefringent means is, after having been emitted, irradiated on a region 74 (see FIG. 2B) on the photographic printing paper 32, which is the region corresponding to the light non-controllable area 64.

As a result, a region 70 on the photographic printing paper 32 corresponding to the liquid crystal cell 60 is entirely exposed, and therefore, occurrence of exposure unevenness caused by the light non-controllable area 64, namely, formation of a pattern can be prevented.

As described above, in the present embodiment, light transmitted through the light controllable area 62 of each of the liquid crystal cells 60 forming the liquid crystal panel 20 is made birefringent by the first and second lithium-niobate prisms 24A, 24B to be irradiated on a region on the photographic printing paper 32 corresponding to the light non-controllable area 64. For this reason, formation of a pattern caused by the light non-controllable area 64 is prevented and a high-quality print can thereby be obtained. By simply providing the first and second lithium-niobate prisms 24A, 24B at the side where the transmitted light from the liquid crystal panel 20 is emitted, a region on the photographic printing paper 32 corresponding to the liquid crystal cell 60 and further an entire region with images being formed can be exposed. Accordingly, it is not necessary that the liquid crystal panel 20 should be moved by using a complicated mechanism like a conventional system, thereby resulting in simplification of the structure of the apparatus and reduction in cost thereof.

Further, in the present embodiment, light transmitted through the light controllable area 62 of each of the liquid crystal cells 60 is made birefringent to be made incident on the region on the photographic printing paper 32 corresponding to the light non-controllable area 64, and therefore, a region on the photographic printing paper 32 corresponding to each of the liquid crystal cells 60 can be almost exposed without moving the liquid crystal panel at one exposure processing. For this reason, as compared with a conventional mechanical pixel shift method with piezoelectric elements used, an exposure time can be substantially reduced and the processing ability can be improved accordingly.

Second Embodiment

A second embodiment of the present invention will be described hereinafter. It should be noted that the same members as those of the first embodiment will be denoted by the same reference numerals, and a description thereof will be omitted. The second embodiment is a modified example of the birefringent filter 24 and the device structure thereof is the same as that of the first embodiment, whose description will be omitted.

Figure 5:
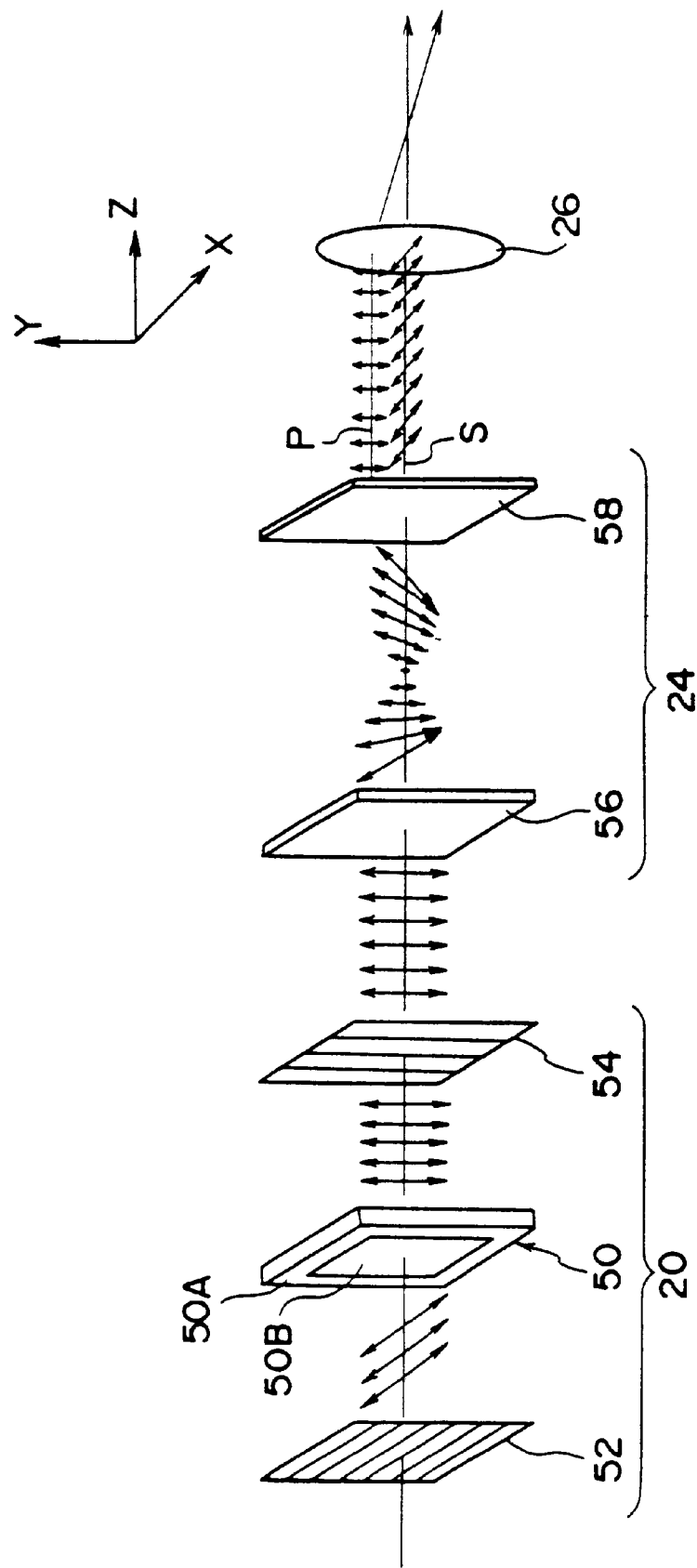
FIG. 5 is an exploded perspective view showing the structure of a liquid crystal panel and a birefringent filter (a calcite prism) according to a second embodiment of the present invention.

As shown in FIG. 5, the birefringent filter 24 according to the second embodiment is used for an optically spatial modulation (birefringence) of the light transmitted from the liquid crystal panel 20 and is formed to have a size for covering the display portion of the liquid crystal panel 20 (of 15.5×40.5 mm and of 5 mm or less in thickness). Further, the birefringent filter 24 has a structure in which the quarter-wave phase plate 56 and the birefringent plate 58 are laminated into close contact with each other. Further, a calcite prism is used as the birefringent plate 58 for the birefringent filter 24 and circularly polarized light from the quarter-wave phase plate 56 is made birefringent so that two optical axes S and P, which are each linearly polarized light and of which directions of polarization cross each other at right angles, are obtained.

Figure 6A:
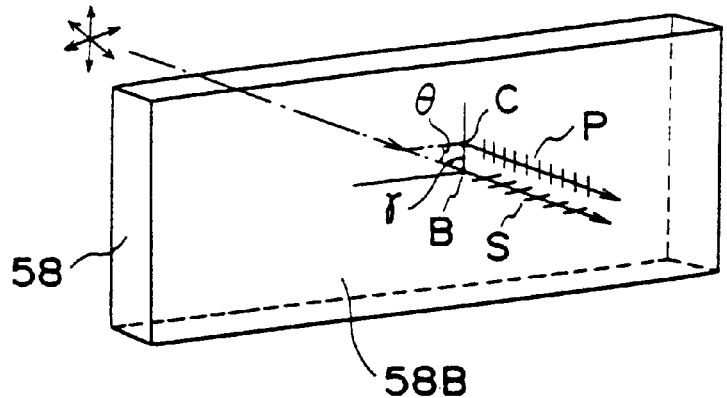
FIGS. 6A and 6B are diagrams, each illustrating the properties of the calcite prism according to the second embodiment.
Figure 6B:
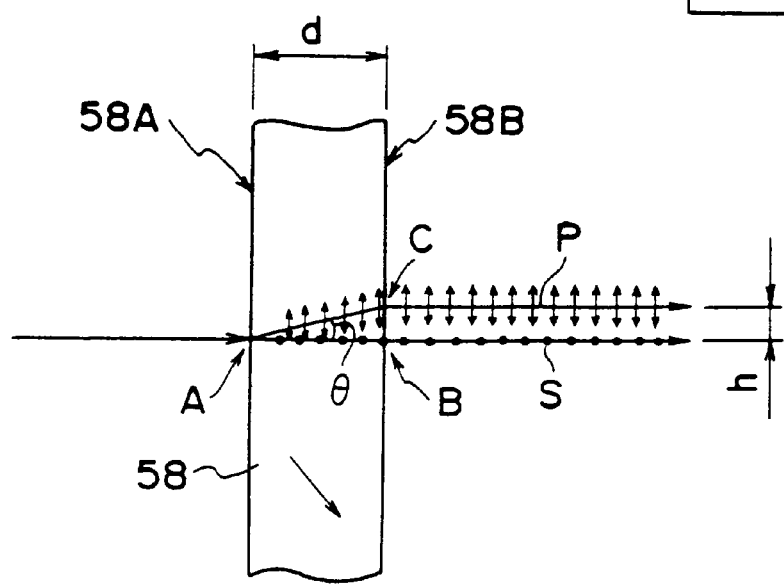

As shown in FIGS. 6A and 6B, when the circularly polarized light formed by the quarter-wave phase plate 56 is made incident on the calcite prism 58 perpendicularly, the incident light is divided into two optical axes S and P, which in turn advance at a predetermined angle θ (in the present embodiment, θ=6°) formed therebetween to become parallel to each other during emission. The distance, h, between the optical axes S and P during emission can be determined based on the thickness, d, of the birefringent prism 58 and the above-described predetermined angle θ. Namely, the relation between the distance h, and thickness d and angle θ is such that h=d·tan θ. For this reason, so long as a pixel shift amount determined by the shape of each of the liquid crystal cells 60 (i.e., an amount by which the liquid crystal panel is moved required for overlapping the areas 64 and 62) is applied to distance h of the above-described relational expression, the region on the photographic printing paper 32 which cannot be exposed by the light non-controllable area 64 of the liquid crystal cell 60 can be exposed. In the present embodiment, the above-described dimension h is set to become a half the pixel pitch $P_V$ in the longitudinal direction of the liquid crystal cell 60 (17.5 μm).

Further, the positional relationship between the optical axes S and P during emission varies depending upon the rotational angle around the exposure optical axis L (Z axis) of the calcite prism 58 with respect to the quarter-wave phase plate 56. For this reason, in the present embodiment, the quarter-wave phase plate 56 and the calcite prism 58 are laminated in a state of being rotated and adjusted around the exposure optical axis L so that a line connecting the optical axes S and P during emission is disposed parallel to the pixel shift direction (i.e., y-axis direction).

Meanwhile, in each of the above-described first and second embodiments, antireflection (AR) processing may be applied to each surface of the quarter-wave phase plate 56 and the birefringent plate 58 so that loss of an amount of transmitted light due to a surface reflection is restrained to the utmost.

Further, in each of the first and second embodiments, LEDs of colors of RGB are used as the exposing light source 14 of the liquid crystal image forming apparatus 10 in such a manner as to be turned on in a time sequential manner. However, a halogen lamp or the like may be used in which white light emitted from the lamp is separated into different colors by color separation filters 16 of RGB to be irradiated on the liquid crystal panel 20.

In the foregoing, the lithium-niobate prism or calcite prism is used as the birefringent filter 24, but the present invention is not limited to the same. For example, other structure may be used in which the transmitted light of the liquid crystal panel 20 is optically space-modulated to allow uniformly exposure of the region on the photographic printing paper 32 corresponding to the liquid crystal cell 60.

What is claimed is:

1. A digital image forming apparatus comprising:
   a spatial modulation element in which a large number of pixels formed by a light controllable area that allows light modulation in accordance with digital image data and a light non-controllable area on which wiring is provided is arranged in a two-dimensional manner at a predetermined pixel pitch;
   a light source that allows light to be irradiated on said spatial modulation element; and
   birefringent means which causes the light transmitted through the light controllable area of said spatial modulation element to be made birefringent into ordinary light whose optical axis directly advances and also into extraordinary light whose optical axes is refracted and which guides the ordinary light and the extraordinary light to a region on a photosensitive material corresponding to the light controllable area and a region on a photosensitive material corresponding to the light non-controllable area, respectively;
   wherein the extraordinary light irradiates the region on the photosensitive material corresponding to the light non-controllable area so as to overlap a region on the photosensitive material corresponding to the light controllable area,
   and further wherein said light source includes a plurality of light source elements respectively emitting light beams for irradiating the photosensitive material, and further wherein optical axes of the light beams are made to coincide with one another by respective dichroic mirrors.

2. A digital image forming apparatus according to claim 1, wherein said birefringent means is formed from a quarter-wave phase plate and a birefringent plate.

3. A digital image forming apparatus according to claim 2, wherein the birefringent plate is a calcite prism.

4. A digital image forming apparatus according to claim 1, wherein the pixels of said spatial modulation element are liquid crystal cells, the light controllable area is an area whose light transmissivity is adjusted in accordance with a drive voltage applied to the liquid crystal cells, and the light non-controllable area is an area whose light transmissivity cannot be adjusted.

5. A digital image forming apparatus comprising:
   a spatial modulation element in which a large number of pixels formed by a light controllable area that allows light modulation in accordance with digital image data and a light non-controllable area on which wiring is provided is arranged in a two-dimensional manner at a predetermined pixel pitch;
   a light source that allows light to be irradiated on said spatial modulation element;
   a quarter-wave phase plate which causes linearly polarized light which was emitted from said light source and passed through the light controllable area of said spatial modulation element to be made into circularly polarized light; and
   a birefringent member which causes the light made into the circularly polarized light by said quarter-wave phase plate to be made birefringent into ordinary light and extraordinary light and which guides the ordinary light and the extraordinary light to a region on a photosensitive material corresponding to the light controllable area and a region on a photosensitive material corresponding to the light non-controllable area, respectively;
   wherein the extraordinary light irradiates the region on the photosensitive material corresponding to the light non-controllable area so as to overlap a region on the photosensitive material corresponding to the light controllable area,
   and further wherein said light source includes a plurality of light source elements respectively emitting light beams for irradiating the photosensitive material, and further wherein optical axes of the light beams are made to coincide with one another by respective dichroic mirrors.

6. A digital image forming apparatus according to claim 5, wherein said birefringent member is composed of a pair of a first and second lithium-niobate prisms.

7. A digital image forming apparatus according to claim 6, wherein positions where the ordinary light and the extraordinary light separated by the pair of lithium-niobate prisms are finally emitted are the center point of the second prism and the position separated therefrom by a fixed distance on a horizontal axis, respectively, and the fixed distance is determined by setting each thickness of the pair of lithium-niobate prisms and the lamination relative angle thereof.

8. A digital image forming apparatus according to claim 5, wherein the pixels of said spatial modulation element are liquid crystal cells, the light controllable area is an area whose light transmissivity is adjusted in accordance with a drive voltage applied to the liquid crystal cells, and the light non-controllable area is an area whose light transmissivity cannot be adjusted.

9. A digital image forming apparatus comprising;
   an image storing section which sequentially reads, by an image reading device, and digitally stores image data stored in each of frames of a negative film;
   a controller which takes in image data of several frames after image data of one roll of negative film are stored in said image storing section to prepare a plurality of index images;

a spatial modulation element, with a large number of pixels being arranged in two-dimensional manner at a predetermined pixel pitch, said spatial modulation element being formed by a light controllable area that allows light modulation based on image data of an image prepared by said controller for each color and a light non-controllable area on which wiring is provided; and a light source that allows light to be irradiated on said spatial modulation element;

said apparatus further comprising:

a quarter-wave phase plate which causes linearly polarized light which was emitted from said light source and passed through the light controllable area of said spatial modulation element to be made into circularly polarized light;

a birefringent member which causes the light made into the circularly polarized light by said quarter-wave phase plate to be made birefringent into ordinary light and extraordinary light and which guides the ordinary light and the extraordinary light to a region on a photosensitive material corresponding to the light controllable area and a region on a photosensitive material corresponding to the light non-controllable area, respectively;

a shutter that allows an image made birefringent by said birefringent member and displayed on said spatial modulation element to be exposed onto the photosensitive material; and a printing lens disposed between said shutter and the photosensitive material;

wherein the extraordinary light irradiates the region on the photosensitive material corresponding to the light non-controllable area so as to overlap a region on the photosensitive material corresponding to the light controllable area, and further wherein said light source includes a plurality of light source elements respectively emitting light beams for irradiating the photosensitive material, and further wherein optical axes of the light beams are made to coincide with one another by respective dichroic mirrors.

10. A digital image forming apparatus according to claim 9, wherein said birefringent member is composed of a pair of first and second lithium-niobate prisms.

11. A digital image forming apparatus according to claim 10, wherein positions where the ordinary light and the extraordinary light separated by the pair of lithium-niobate prisms are finally emitted are the center point of the second prism and the position separated therefrom by a fixed distance on a horizontal axis, respectively, and the fixed distance is determined by setting each thickness of the pair of lithium-niobate prisms and the lamination relative angle thereof.

12. A digital image forming apparatus according to claim 9, wherein the pixels of said spatial modulation element are liquid crystal cells, the light controllable area is an area whose light transmissivity is adjusted in accordance with a drive voltage applied to the liquid crystal cells, and the light non-controllable area is an area whose light transmissivity cannot be adjusted.

13. A digital image forming apparatus according to claim 1, wherein said light source element is an LED.

14. A digital image forming apparatus according to claim 5, wherein said light source element is an LED.

15. A digital image forming apparatus according to claim 9, wherein said light source element is an LED.

16. A digital image forming apparatus according to claim 1, wherein an optical axis of the extraordinary light is refracted to one of an X-direction and Y-direction of the spatial modulation element.

17. A digital image forming apparatus according to claim 5, wherein an optical axis of the extraordinary light is refracted to one of an X-direction and Y-direction of the spatial modulation element.

18. A digital image forming apparatus according to claim 9, wherein an optical axis of the extraordinary light is refracted to one of an X-direction and Y-direction of the spatial modulation element.

* * * * *